United States Patent
Meek et al.

[15] 3,691,937
[45] Sept. 19, 1972

[54] COMBINED BROILER PAN AND BROIL RACK

[72] Inventors: Flora L. Meek; Christian A. Eff, both of Louisville, Ky.

[73] Assignee: General Electric Company

[22] Filed: Feb. 4, 1971

[21] Appl. No.: 112,681

[52] U.S. Cl..................99/340, 99/400, 99/421 HV, 99/446, 99/450
[51] Int. Cl..............................................A47j 37/06
[58] Field of Search........99/340, 339, 385, 400, 401, 99/421 R, 421 H, 426, 449, 450; 211/71

[56] References Cited

UNITED STATES PATENTS

| | | | |
|---|---|---|---|
| 446,855 | 2/1891 | Earle | 99/426 |
| 728,067 | 5/1903 | Young | 99/426 |
| 2,597,127 | 5/1952 | Rahr | 99/401 |
| 2,787,948 | 4/1957 | Mathis | 99/421 R |
| 2,847,932 | 8/1958 | More | 99/421 H |
| 2,874,631 | 2/1959 | Cooksley | 99/400 |
| 2,885,951 | 5/1959 | Wolske | 99/421 H X |
| 3,008,406 | 11/1961 | Reeves et al. | 99/421 H X |

*Primary Examiner*—Walter A. Scheel
*Assistant Examiner*—Arthur O. Henderson
*Attorney*—Richard L. Caslin, Francis H. Boos, Jr., Frank L. Neuhauser, Oscar B. Waddell and Joseph B. Forman

[57] ABSTRACT

A combined broiler pan and broil rack assembly where the rack is of open wire construction that is supported in an elevated position above the pan so as to space the pan and hence the grease that accumulates therein during the broiling operation far enough away from the source of the radiant energy so as to retard the generation of smoke. A pair of inverted U-shaped stanchions serve as the support means for the rack. Stabilizing means are combined with the stanchions to rigidify the assembly. Preferably the stanchions may alternately serve as the support means of a rotisserie spit in place of the broil rack.

6 Claims, 3 Drawing Figures

PATENTED SEP 19 1972 3,691,937
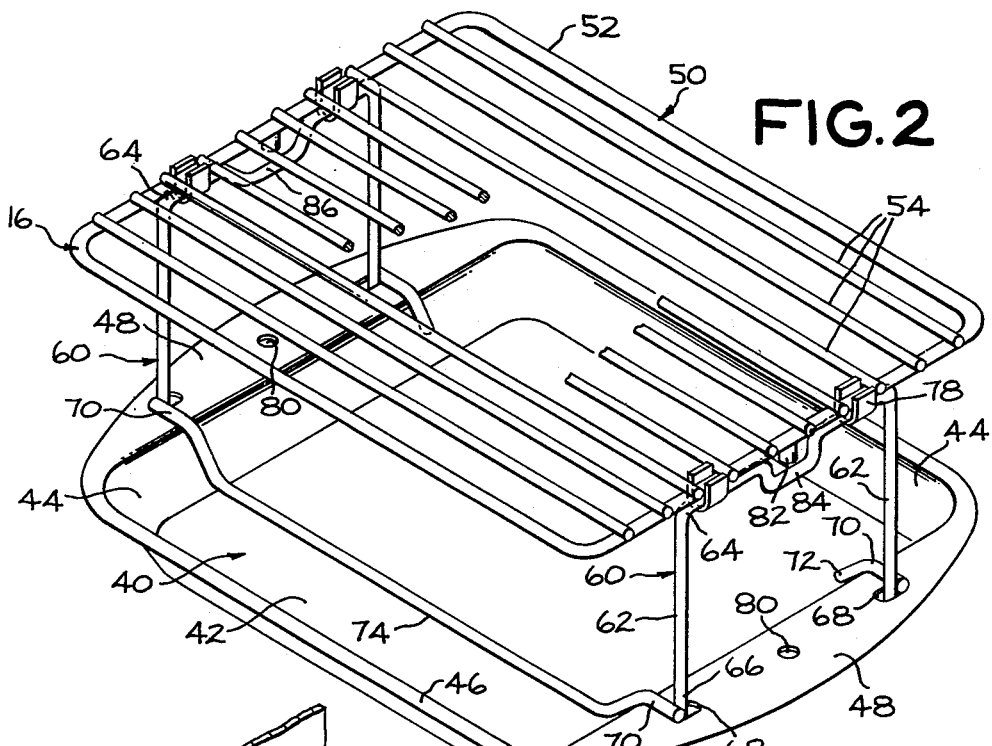
FIG. 2
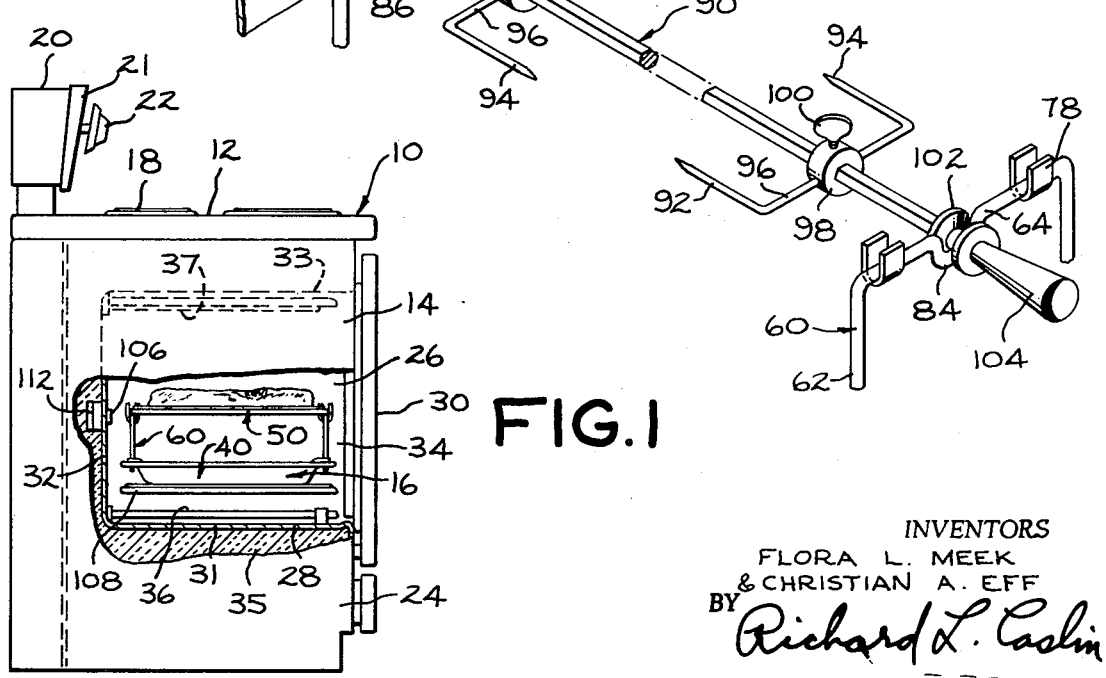
FIG. 3
FIG. 1
INVENTORS
FLORA L. MEEK
& CHRISTIAN A. EFF
BY Richard L. Caslin
THEIR ATTORNEY 3,691,937

COMBINED BROILER PAN AND BROIL RACK

BACKGROUND OF THE INVENTION

Oven cooking of tender cuts of meat by dry, radiant heat is usually accomplished from an overhead source of radiant heat at the top of the oven cooking cavity. The general rule for meat cookery is to use a low temperature, but the broiling of meat is one exception. A high temperature is necessary, especially for beef and lamb, to give an appetizing brown color without overcooking the meat. Because of the high speed of broiling, the high temperature does not affect the tenderness and juiciness of the meat. Many people call this charcoal broiling. When broiling in an electric oven, the oven door is left slightly ajar so that the upper broil element will remain ON during the entire broiling operation to give constant radiant cooking. This open door allows a sweep of cool air into the oven cavity that tends to keep the oven thermostat probe at a reduced temperature thereby signaling the source of heating power for more heat. If the broil element were deenergized during part of the broiling operation, the meat would be partially cooked by the surrounding heat in the cooking cavity and this cooking process would become a combination broiling and roasting operation which is undesirable.

The broiling time in minutes per side, and the distance from the top of the meat to the broil heating unit are the two most important factors. The thickness of the meat, the degree of doneness and the wattage of the electric unit or the BTU rating of a gas burner, as the case may be, and the distance between the meat and the heating source determine the time of cooking. Thick cuts of meat which are to be WELL DONE are placed farther away from the heating unit and are heated for a longer time. Thin cuts of meat which are to be cooked to a RARE degree of doneness are placed close to the unit and heated for a relatively short time. Meats should be turned over only once during broiling.

In the past, this broiling operation has been done with the meat supported in a shallow broiler pan which collects the grease drippings from the meat. In the high shelf position of the broiler pan when the meat is to be cooked either RARE or MEDIUM these pan drippings may become overheated and then spatter over much of the walls forming the oven cooking cavity, in which event heavy smoking occurs. One possibility that has been used is to install a wire rack in the broiler pan and substantially cover the rack with aluminum foil. It is necessary to cut narrow slits in the foil such that the drippings will drain through the slits into the pan and be shielded from the radiant energy. Without these slits the drippings and juices would pool together and they may become hot enough to catch fire.

The principal object of the present invention is to provide a combined broiler pan and broil rack assembly where the rack is of open wire construction and supported in an elevated position above the pan such that the pan drippings will be always spaced a sufficient distance from the source of radiant heat as to substantially eliminate the spattering and smoking of the food drippings.

A further object of the present invention is to provide a combined broiler pan and elevated broil rack with stable support means holding the broil rack.

A further object of the present invention is to provide a combined broiler pan and elevated broil rack with a stable support means for the rack that can be alternated for use in supporting a rotisserie spit.

A further object of the present invention is to provide a pan and rack assembly of the class described with indexing means to insure the centering of the rack with respect to the support means and the pan.

SUMMARY OF THE INVENTION

The present invention, in accordance with one form thereof, relates to a combined broiler pan and broil rack where the pan is provided at each end with an enlarged flange. A large inverted stanchion is arranged over each flange and it is adapted to be supported thereby. There is a broil rack of open wire construction adapted to be supported from the top of the stanchions. Each stanchion is provided with at least one saddle member for receiving a portion of the rack therein and restricting the relative movement therebetween.

BRIEF DESCRIPTION OF THE DRAWINGS

This invention will be better understood from the following description taken in conjunction with the accompanying drawings and its scope will be pointed out in the appended claims.

FIG. 1 is a left side elevational view of a free-standing electric range with a part of the side wall broken away and others in cross-section to show the interior of the oven cooking cavity, with a combined broiler pan and elevated broil rack embodying the present invention positioned therein.

FIG. 2 is an isometric view on an enlarged scale of the combined broiler pan and elevated broil rack shown in FIG. 1.

FIG. 3 is a fragmentary isometric view showing a rotisserie spit suspended from the rack-supporting stanchions of the broiler pan, in place of the broil rack of FIG. 2.

DESCRIPTION OF THE PREFERRED EMBODIMENT

Turning now to a consideration of the drawings, and in particular to FIG. 1, there is shown a free-standing electric range 10 comprising both a cooktop 12 and an underlying oven construction 14. The present invention relates to a combined broiler pan and elevated rack assembly 16 shown positioned within the oven, but certain of the general constructional details of the range 10 will be described first for background information.

The cooktop 12 is provided with a plurality of surface heating elements 18 and a backsplash 20 having a front-facing control panel 21 supporting a plurality of control components 22 that govern the heating elements and other functions for both the cooktop 12 and the oven 14, as is conventional in this art. Located beneath the cooktop 12 is the oven structure 14 that includes an outer cabinet or body 24 and an oven cooking cavity 26 that is formed by a boxlike oven liner 28 and a front-opening access door 30. The oven liner 28 has a bottom wall 31, a rear wall 32, a top wall 33 and opposite side walls 34, 34. A blanket of thermal insulation 35 encircles the oven liner 28 to retain the oven heat. There is a lower baking element 36 and an upper broiling element 37 arranged directly beneath the upper wall 33 of the oven liner. As is conventional, the opposite side walls 34, 34 of the oven liner are provided with a plurality of oppositely arranged, vertically spaced, rack-supporting means such as embossments, ledges or wire rails, none of which are shown here for the sake of simplicity of the drawing.

Looking at FIG. 2, there is a shallow broiler pan 40 of relatively large area which may be a heretofore conventional broiler pan which is modified for use in the present invention. This pan has a large flat bottom wall 42 and slightly inclined side walls 44 which are finished off with a horizontal bead or flange 46 which completely encircles the four walls of the pan. This flange 46 is enlarged in area at the two opposite ends of the pan as at 48. These enlarged flanges 48 also serve as hand grips for ease in carrying the pan and its contents.

There is a separate, welded-wire broil rack 50 of open configuration which is substantially the same size in plan view as the broiler pan 40. This rack is of generally rectangular form shown with a continuous wire frame 52 forming its periphery and a plurality of wire strips 54 which are shown extending longitudinally of the rack in a spaced parallel relationship with each other, and fastened at each end to the wire frame 52 as by welding, brazing or the like. One criteria is that this broil rack 50, which is adapted to support the meat that is to be broiled thereon, should have a very small surface area in the path of the radiant energy from the broil unit 37. The advantage of this small vertical silhouette is that grease and food drippings will be discouraged from hanging thereon and will drop to the pan 40 below.

It is important to support the broil rack 50 in an elevated position above the broiler pan 40 so as to space the pan and hence the grease that accumulates therein during the broiling operation far enough away from the source of radiant energy 37 so as to retard the generation of smoke and the spattering of the grease throughout the cooking cavity. One example is a vertical elevation of about five inches between the rack 50 and the bottom wall 42 of the pan 40. As best seen in FIG. 2, a pair of inverted U-shaped stanchions 60 are supported in the enlarged flanges 48 of the pan 40 and are adapted to have the broil rack 50 suspended therebetween. Each stanchion 60 is of bent wire form of inverted U-shape having a pair of parallel legs 62 and an uppermost bight portion 64. The lower portion or foot 66 of each vertical leg 62 is adapted to project into a hole 68 formed in the enlarged flange 48 of the pan 40, in the manner of a post seated in a post hole. There is one distinction. Some means must be provided to prevent the leg 62 from slipping down through the hole 68. In other words, means must be provided to limit the extent to which the vertical leg 62 extends through the opening 68. Each leg 62 is provided with a stabilizing means 70 which is fastened transversely across the foot 66 of the leg in a generally horizontal direction to be seated upon the enlarged flange 48. This stabilizing means 70 is in the form of a short length of wire that is welded or otherwise fastened to the foot 66, and it has a downwardly inclined extension 72 which follows the contour of the inclined wall 44 of the pan for at least the top portion thereof to restrict the angular movement of the leg 62 in the opening 68.

Notice that on at least one side of the pan 40 the two stabilizing means 70 are connected together to form a singular strut member 74 thereby joining the two stanchions 60 into a unitary assembly for the sake of rigidity. While the presence of the cross connecting strut member 74 tends to render the stanchion 60 a little difficult to store in the kitchen cabinets when it is not being used, the advantages of rigidity far outweigh the disadvantages of convenient storage. The bight portion 64 of each stanchion 60 is provided with a pair of upwardly directed U-shaped clip members or saddle members 78 which are slipped up under the bight portion 64 and welded in place such that the broil rack 50 may be suspended between the two stanchions 60, 60 by having the peripheral wire frame 52 at the opposite ends of the rack 50 seated within the saddle members 78. The wire strips 54 are so spaced apart that when seated within the saddle members 78 certain of the strips 54 are arranged closely beside the saddle members 78 such that horizontal movement of the rack with respect to the stanchions is precluded.

There are times when the broil rack 50 is usable by supporting it directly upon the top of the broiler pan 40. Since the rack 50 has about the same size in plan view as the broiler pan itself, it is well to provide some means for interlocking the rack 50 with the pan 40 to prevent the rack from sliding off. This is accomplished by forming a center hole in each enlarged flange 48 and providing the rack 50 with a pin-like downward extension 82 in the center of the opposite ends of the rack fastened to the underside of the peripheral wire frame 52. Thus when the rack 50 is lowered onto the pan 40 these two pins 82 slip into the center holes 80 and prevent the rack 50 from sliding off the top of the pan. Such an accident could be a serious occurrence if hot grease were in the pan, and the pan and rack supporting a large cut of meat was being removed from the oven. Some provision must be made in the design of the bight portion 64 of each stanchion 60 so as to accommodate these pins 82 so that the pins do not interfere with the proper support of the rack 50 in the saddle members 78. This is accomplished by designing the bight portion 64 with a central down-turned depression 84 on one stanchion and 86 on the opposite stanchion. The reason these down-turned formations are given different reference numerals is that they are not identical formations. The formation 84 is of less width than the formation 86, as is best seen in FIG. 3.

This invention has been designed with a dual purpose for the stanchions 60, 60 so that they may either be used to support the broil rack 50 during the broiling operation as seen in FIG. 2 or may alternatively be used to support a rotisserie spit 90 on which may be entailed a large cut of meat such as chicken, turkey, a roast and the like as seen in FIG. 3. Such a spit 90 is generally of standard construction being a slender, pointed, metal rod or shaft of non-circular transverse cross-section, which is shown as being a six-sided configuration for supporting a pair of skewers 92. Each skewer 92 is of fork-like configuration having a pair of widely spaced tines 94 and a connecting portion 96 which is supported from a central hub or collar 98 which slips onto the spit 90 in a close fitting relationship. This collar has a thumb screw 100 threaded into the collar for engagement with the spit 90 in the manner of an easily adjustable lock screw. The tines 94 of each skewer 92 are adapted to face each other such that any meat to be supported on the spit would be impaled on the spit and then the skewers would be forced into the meat in a clamping relationship and locked in place by means of the thumb screws 100. This forces the meat to turn when the spit is turned so as to expose all sides of the meat to the radiant heat.

Once the meat is supported on the rotisserie spit the spit is then suspended between the spaced stanchions 60 in a special manner. The spit 90 has a small double flanged roller 102 which is adapted to slip down into the depressed formation 84 of the bight portion 64 of one of the stanchions 60. This flanged roller 102 is mounted on the spit 90 adjacent a removable handle 104 which would be the outermost end of the spit 90 nearest the oven door 30. The opposite end or pointed end 110 of the spit 90 is adapted to fit into a socket 106 that is mounted in the back wall 32 of the oven liner at such a height that when the broiler pan 40 is supported from an oven shelf 108 at a proper elevation the rotisserie spit 90 will be at the same level as the socket 106 and its pointed end 110 will slip therein. This socket 106 is a driven member of a rotisserie motor and speed reducing assembly 112 which is mounted on the back side of the rear wall 32 of the oven liner as is conventional in this art. It should be noticed in Fig. 3 that when the rotisserie spit 90 is inserted in the socket 106 the spit is no longer supported directly upon the depression 86 in the rear stanchion 60. In other words, the spit 90 is supported from only two points; namely, the socket 106 and the front stanchion 60. The reason for this is the difficulty in lining up a three point support which is rather difficult to achieve with perfect accuracy if both stanchions 60, 60 and the socket 106 were to engage the spit 90. Once the tip 110 of the spit 90 is withdrawn from the socket 106 the spit then rests across the two stanchions 60, 60 so that when the broiler pan 40 is removed from the oven the spit 90 will have the proper support.

Modifications of this invention will occur to those skilled in this art, therefore it is to be understood that this invention is not limited to the particular embodiments disclosed, but that it is intended to cover all modifications which are within the true spirit and scope of this invention as claimed.

What is claimed as new and desired to be secured by Letters Patent of the United States is:

1. A combined broiler pan and broil rack where the pan has an enlarged flange at each end, the broil rack being of open wire framework that is adapted to be supported from the pan in an elevated position of greater than three inches distance from the bottom of the pan, the rack having support means comprising a series of legs which overlie the flanges of the pan, said flanges having sockets formed therein for receiving the feet of the legs therein, the legs including stabilizing means cooperating with the pan for restricting relative movement of the rack with respect to the pan, wherein the said rack support means is separable from the rack means and comprises a pair of U-shaped stanchions arranged one at each end of the broiler pan over the related flange of the pan, the upper portion of the stanchion including restraining means engaging the rack to restrict relative movement therebetween.

2. A combined broiler pan and broil rack as recited in claim 1 wherein there is at least one strut member joining the foot of one stanchion with the related foot of the opposite stanchion, said strut member also being in engagement with the pan for reinforcing the stanchions.

3. A combined broiler pan and broil rack comprising a pan having an enlarged flange at the opposite ends thereof, a pair of large inverted U-shaped stanchions arranged one over each flange, means for supporting the stanchions in an upright position from the said flanges, and a separable broil rack of open wire construction adapted to be supported on the said stanchions, each stanchion including at least one saddle member adjacent the top portion there of for receiving a portion of the rack therein and restricting the relative movement therebetween. thereof 4. A combined broiler pan and broil rack as recited in claim 3 wherein the said support means for the stanchions comprises sockets formed in the flanges of the broiler pan for receiving the lower end of the legs of the U-shaped stanchions, the legs also being furnished with stabilizing means seated on the flanges, and at least one strut member joined to the leg of one stanchion and also to the opposite leg of the other stanchion so as to rigidify the assembly.

5. A combined broiler pan and broil rack as recited in claim 4 wherein each of the opposite ends of the broil rack is provided with a downwardly projecting tab adjacent the center thereof, while the upper end of each stanchion is provided with a generally central depression for receiving the said rack tabs and thereby positioning the rack centrally of the broiler pan.

6. A combined broiler pan and broil rack as recited in claim 5 wherein the broil rack may be removed from the said stanchions, the stanchions being of such a height that the said depressions in the upper end of the stanchions are adapted to serve as a support means for a rotisserie spit that would be suspended between the stanchions in place of the broil rack.

* * * * *